United States Patent  (10) Patent No.: US 9,166,721 B2
Willner et al.  (45) Date of Patent: Oct. 20, 2015

(54) RECONFIGURABLE OPTICAL TRANSMITTER

(71) Applicant: University of South California, Los Angeles, CA (US)

(72) Inventors: Alan E. Willner, Los Angeles, CA (US); Mohammad Reza Chitgarha, Los Angeles, CA (US); Salman Khaleghi, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/887,119

(22) Filed: May 3, 2013

(65) Prior Publication Data

US 2013/0294777 A1 Nov. 7, 2013

Related U.S. Application Data

(60) Provisional application No. 61/643,191, filed on May 4, 2012.

(51) Int. Cl.
*H04J 14/00* (2006.01)
*H04B 10/50* (2013.01)
*H04B 10/516* (2013.01)
*H04J 14/02* (2006.01)

(52) U.S. Cl.
CPC ............ *H04J 14/002* (2013.01); *H04B 10/505* (2013.01); *H04B 10/506* (2013.01); *H04B 10/5161* (2013.01); *H04J 14/00* (2013.01); *H04J 14/02* (2013.01); *H04J 14/0254* (2013.01)

(58) Field of Classification Search
CPC ..... H04J 14/002; H04J 14/00; H04J 14/0254; H04J 14/02; H04B 10/505; H04B 10/5161; H04B 10/506
See application file for complete search history.

(56) References Cited

U.S. PATENT DOCUMENTS

| 2002/0063929 A1* | 5/2002 | Huber ........................... 359/154 |
| 2003/0152346 A1* | 8/2003 | Aso et al. ...................... 385/123 |
| 2006/0061853 A1* | 3/2006 | Chraplyvy et al. ........... 359/330 |
| 2009/0245297 A1* | 10/2009 | Richter ........................... 372/21 |
| 2012/0154903 A1* | 6/2012 | Miesak .......................... 359/330 |
| 2013/0315598 A1* | 11/2013 | Marom et al. .................. 398/79 |

OTHER PUBLICATIONS

Y. Koizumi et al., "1024 QAM (60 Gbit/s) single-carrier coherent optical transmission over 150 km", Optics Express, vol. 20, No. 11, pp. 12508-12514 (2012).

(Continued)

*Primary Examiner* — Shi K Li
*Assistant Examiner* — Mina Shalaby
(74) *Attorney, Agent, or Firm* — Fish & Richardson P.C.

(57) ABSTRACT

The present disclosure includes systems and techniques relating to reconfigurable optical transmitters. In some implementations, an apparatus, systems, or methods can include multiple ports to receive independent optical data signals or independent electrical signals that are converted into independent optical data signals, at least one optical pump laser, and one or more nonlinear optics elements configured and arranged to generate a phase conjugate for each of the independent optical data signals at least by combining the respective independent optical data signal with an output of the optical pump, and generate an output optical signal from the independent optical data signals at least by combining each of the independent optical data signals with its corresponding generated phase conjugate.

13 Claims, 13 Drawing Sheets

(56) References Cited

OTHER PUBLICATIONS

D. J. Geisler et al., "Bandwidth scalable, coherent transmitter based on the parallel synthesis of multiple spectral slices using optical arbitrary waveform generation," Optics Express, vol. 19, No. 9, pp. 8242-8253 (2011).

G. Huang et al., "All-Optical OOK to 16-QAM Modulation Format Conversion Employing Nonlinear Optical Loop Mirror," Journal of Light Technology, vol. 30, No. 9, pp. 1342-1350 (2012).

P. Winzer, et al, "Advanced Modulation Formats for High-Capacity Optical Transport Networks," Journal of Lightwave Technology, vol. 24, No. 12, pp. 4711-4728 (2006).

S. Okamoto et al., "512 QAM (54 Gbit/s) Coherent Optical Transmission over 150 km with an Optical Bandwidth of 4.1 GHz," ECOC 2010, paper PD2.3.

Guo-Wei Lu et al., "40-Gbaud 16-QAM transmitter using tandem IQ modulators with binary driving electronic signals," Optics Express, vol. 18, No. 11, pp. 23062-23069 (2010).

Z. Bakhtiari et al., "Experimental Optical Tunable Phase-Coherent Multiplexing of Four 20-Gbaud OOK Signals into a Single 80-BGbit/s 16-QAM and Star 16-QAM Signal," CLEO Technical Digest 2012, Paper CTh1H.3.

M. Jinno, et al., "Demonstration of novel spectrum-efficient elastic optical path network with per-channel variable capacity of 40 Gb/s to over 400 Gb/s," ECOC 2008, paper Th.3.F.6.

X. Wu et al., "Experimental Optical Multiplexing of Two 20-Gbit/s QPSK Data Channels from Different Wavelengths onto a Single 40-Gbit/s Star 16-QAM using Fiber Nonlinearities," CLEO 2011, Paper CThH4.

L. Zhang et al., "Multiple 16QAM Signals Generation at 40Gbit/s Using a Novel Transmitter," Proceedings of the 15th Asia-Pacific-Converence on Communications (APCC 2009)-146, pp. 609-612, 2009.

E. S. Nazemosadat et al., "Numberical Investigation of All-Optical RZ-8-APSK Generation Based on Fiber Nonlinearities," 15th OptoElectronics and Communications Conference (OECC 2010) Technical Digest, pp. 488-489, Jul. 2010.

Guo-Wei Lu, et al., "Flexible high-order QAM transmitter using tandem IQ modulators for generating 16/32/36/64-QAM with balanced complexity in electronics and optics," Optics Express, vol. 21, No. 5, 6213-6223 (2013).

C. Langrock et al., "All-Optical Signal Processing Using X(2) Nonlinearities in Guided-Wave Devices", Journal of Lightwave Technology, vol. 24, No. 7, Jul. 2006.

Wang et al., "44-ns Continuously Tunable Dispersionless Optical Delay Element Using a PPLN Waveguide With Two-Pump Configuration, DCF, and a Dispersion Compensator," IEEE Photonics Technology Letters, vol. 19, No. 11, Jun. 1, 2007.

\* cited by examiner

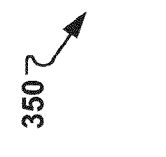
FIG. 3A
310-1
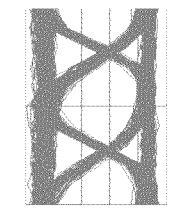
FIG. 3B
310-2
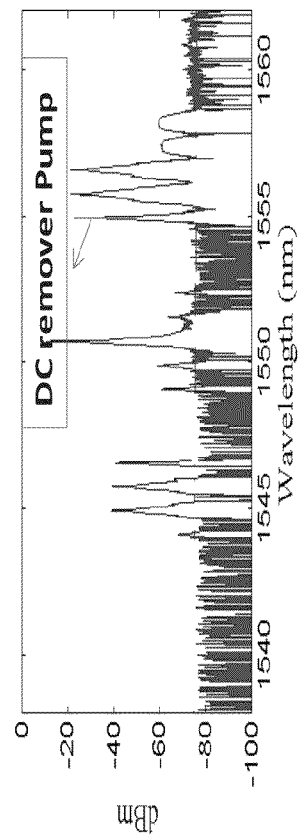
FIG. 3E
350
FIG. 3F
360
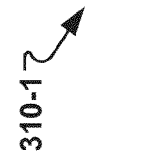
FIG. 3C
370
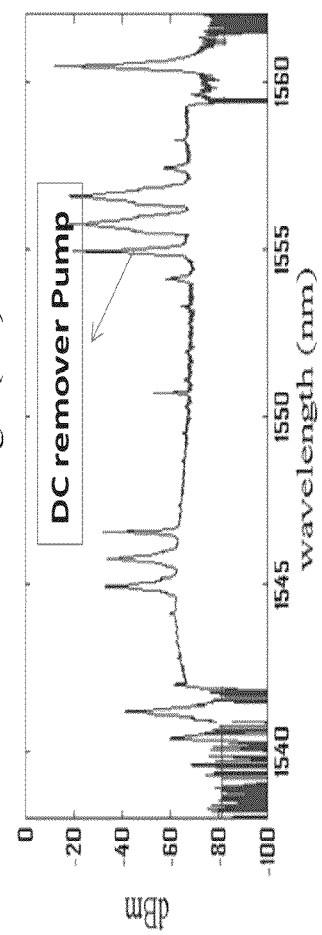
FIG. 3D
380

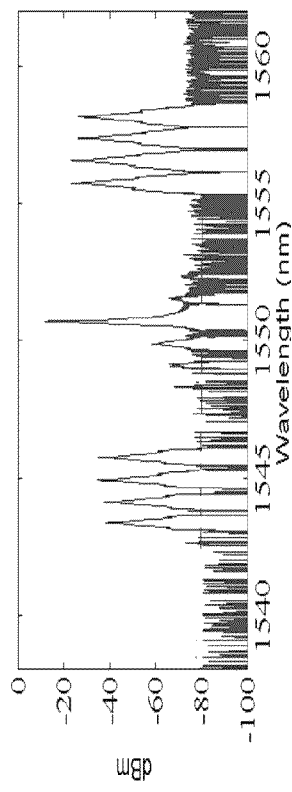
FIG. 4A
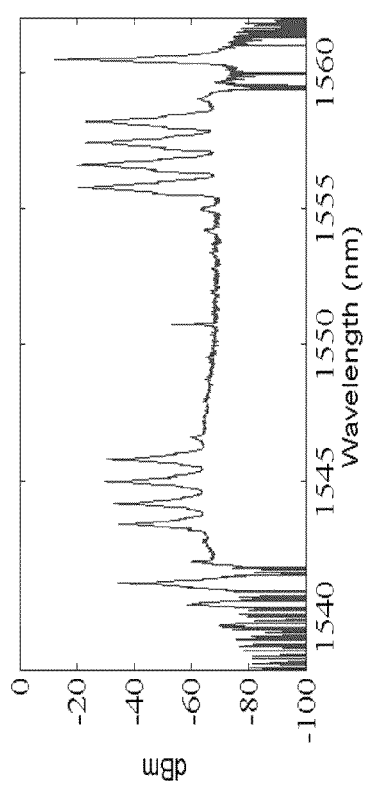
FIG. 4B
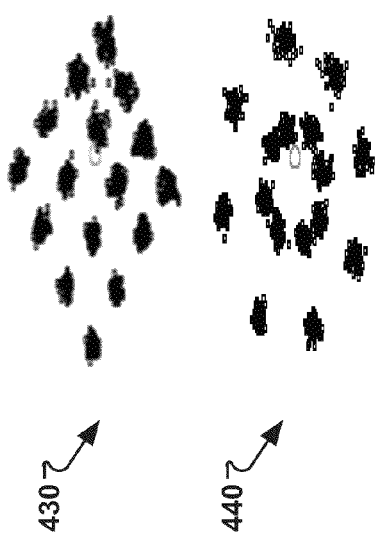
FIG. 4C
FIG. 4D

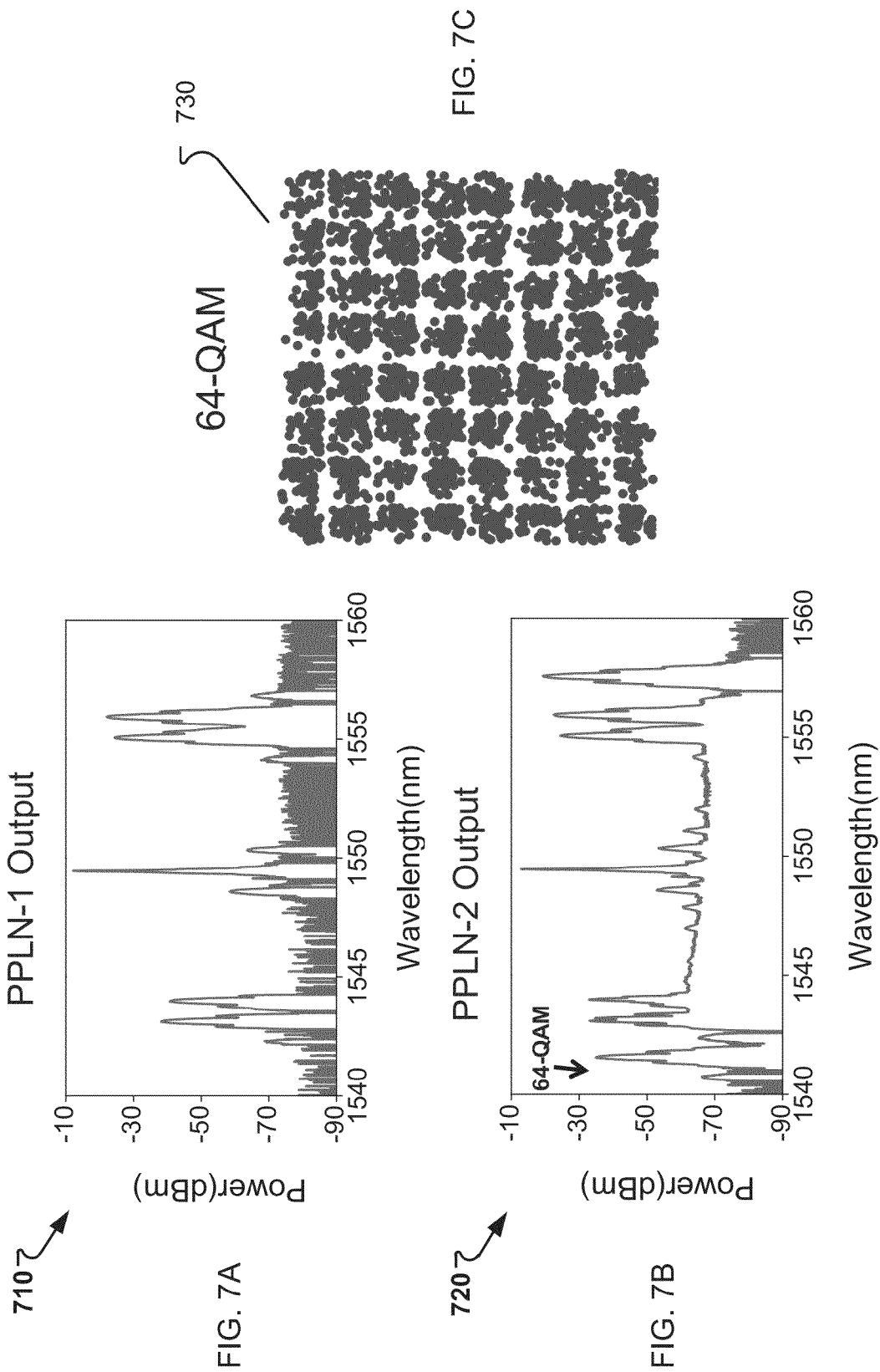

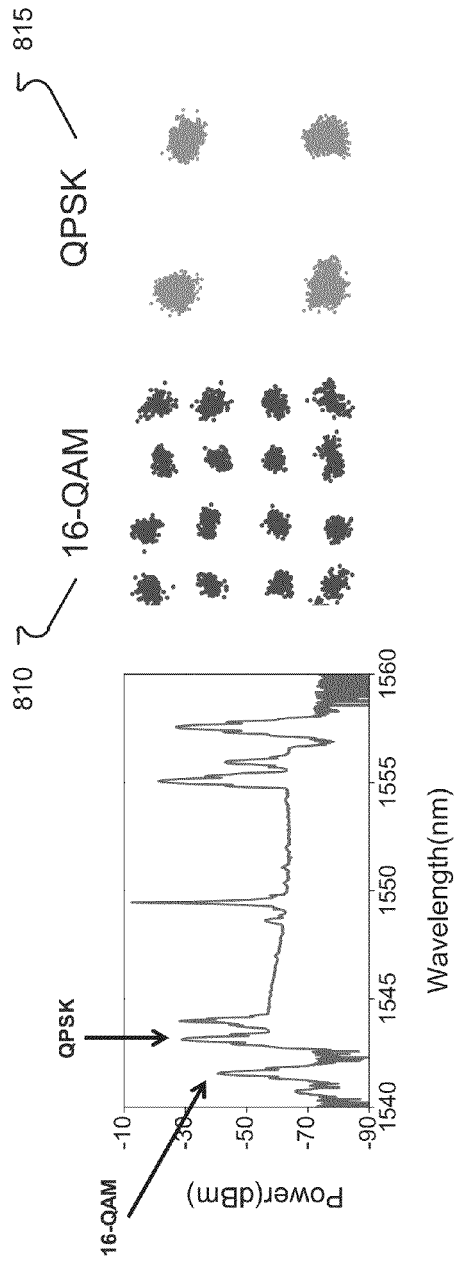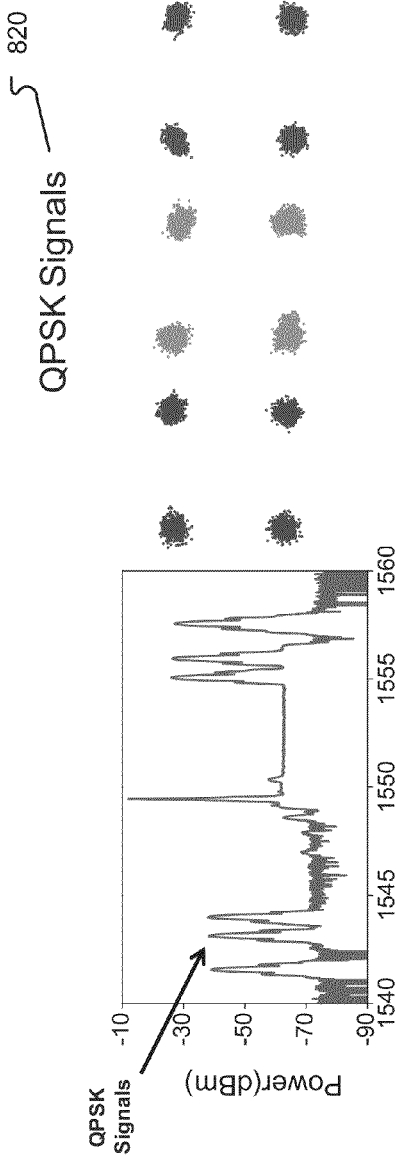
FIG. 8A
FIG. 8B
FIG. 8C
FIG. 8D

RECONFIGURABLE OPTICAL TRANSMITTER

CROSS REFERENCE TO RELATED APPLICATIONS

This application claims the benefit of the priority of U.S. Provisional Application Ser. No. 61/643,191, filed May 4, 2012 and entitled "RECONFIGURABLE OPTICAL TRANSMITTER," the entire contents of which are hereby incorporated by reference.

BACKGROUND

The present disclosure describes systems and techniques relating to reconfigurable optical transmitters.

Dramatic growth in data capacity demand in optical networks has necessitated a simultaneous increase in the data speeds of terminal transmitters. For example, state-of-the-art transceivers are capable of providing 100-Gbit/s data rates or more per channel, and these channels can employ the use of spectrally efficient higher-level modulation amplitude/phase formats as well as coherent technologies.

SUMMARY

The present disclosure includes systems and techniques relating to reconfigurable optical transmitters. According to an aspect of the described systems and techniques, a method includes receiving independent optical data signals from different sources, generating a phase conjugate for each of the independent optical data signals, and generating an output optical signal from the independent optical data signals at least by combining each of the independent optical data signals with its corresponding generated phase conjugate to remove phase noise.

In some implementations, generating the phase conjugate of each of the independent optical data signals can include combining the respective independent optical data signal with a pump output. In some implementations, the method can include introducing a delay between the independent optical data signal and its phase conjugate prior to combining them together. In some implementations, the independent optical data signals can be received from independent electrical to optical devices, and the independent optical data signals can be lower order data signals than the generated output optical signal.

According to another aspect of the described systems and techniques, a reconfigurable optical transmitter includes multiple ports to receive independent optical data signals or independent electrical signals that are converted into independent optical data signals, at least one optical pump laser, and one or more nonlinear optics elements configured and arranged to generate a phase conjugate for each of the independent optical data signals at least by combining the respective independent optical data signal with an output of the optical pump, and generate an output optical signal from the independent optical data signals at least by combining each of the independent optical data signals with its corresponding generated phase conjugate to remove phase noise.

In some implementations, the one or more nonlinear optical elements can include two periodically-poled-lithium-niobate waveguides. In some implementations, the reconfigurable optical transmitter can also include a chromatic dispersion element. The chromatic dispersion element can include a dispersion compensating fiber. In some implementations, the reconfigurable optical transmitter can also include a beam-shaping filter. The beam-shaping filter can include a liquid-crystal-on-silicon filter.

According to another aspect of the described systems and techniques, a method includes receiving an optical signal from a coherent optical frequency comb, where the optical signal includes multiple elements, generating modulated signals by modulating at least a set of elements of the multiple elements, and generating an output optical signal at least in part by phase coherent addition of the modulated signals.

In some implementations, the phase coherent addition of the modulated signals can include combining a pump output with the modulated signals and another set of elements of the multiple elements. In some implementations, the phase coherent addition can be performed by a single periodically-poled-lithium-niobate waveguide. In some implementations, the set of elements can be modulated using a quadrature-phase-shift-keyed format.

According to another aspect of the described systems and techniques, a tunable optical transmitter includes one or more ports to receive a coherent optical frequency comb including multiple elements, a modulator configured to modulate a set of elements of the multiple elements, and a nonlinear optics element configured to generate an output optical signal at least in part by phase coherent addition of the modulated set of elements.

In some implementations, the tunable optical transmitter can also include an optical pump laser, and the nonlinear optics element can be configured to generate the output signal, at least in part, by combining an output of the pump laser with respective elements of the modulated set of elements and another set of elements of the multiple elements. In some implementations, the modulator can be configured to modulate the set of elements with a quadrature-phase-shift-keyed format. In some implementations, the nonlinear optics element can include a single periodically-poled-lithium-niobate waveguide. In some implementations, the phase coherent addition of the modulated set of elements can be performed through two cascaded second order nonlinear wave mixings. In some implementations, the optical output signal can be a higher-order quadrature-amplitude-modulation signal. In some implementations, the tunable optical transmitter can also include a liquid crystal on silicon (LCoS) filter configured to select the set of elements of the multiple elements. The LCoS filter can be configured to select the set of elements, at least in part, by writing complex weights on the multiple elements and separating the multiple elements into the set of elements and another set of elements.

Particular embodiments of the subject matter described in this specification can be implemented so as to realize one or more of the following advantages. The described methods and techniques can be implemented to generate high order (e.g., 16 QAM, 64-QAM and higher order) modulation formats by using optical approaches to provide higher baud rates and constellation sizes.

The described methods and techniques can also be implemented to create a flexible reconfigurable optical transmitter whose capacity can be tailored and shared among different channels since the traffic demands vary in a dynamic heterogeneous network. Flexible, reconfigurable bandwidth allocation can enable optimal use of terminal equipment as well as create new opportunities for scalable and cost-effective network architectures.

Details of one or more implementations are set forth in the accompanying drawings and the description below. Other

DRAWING DESCRIPTIONS

FIGS. 3A-3F show examples of two incoming OOK signals multiplexed into a single 4-PAM channel.

FIGS. 4A-4D show an example of optical multiplexing of four OOK inputs into a 16 QAM signal with a DC offset and optical multiplexing of 4 OOK channels into a star 16 QAM signal.

FIG. 7A shows an example of an optical spectrum of a first stage in which phase conjugate copies of original QPSK signals are generated at corresponding wavelengths.

FIG. 7B shows an example of an optical spectrum of an output of a second PPLN as well as a final I-Q constellation.

FIG. 7C shows an example of a 64-QAM with EVM ~7%.

FIGS. 8A-8B show an example of two QPSK multiplexed to generate a 16-QAM.

FIGS. 8C-8D show an example of a reconfigured transmitter to generate 3 QPSK signals.

DETAILED DESCRIPTION

Part I: Optical Tunable Phase-Coherent Multiplexing of Four 20-Gbaud OOK Signals into a Single 80-Gbit/s 16-QAM and Star 16-QAM Signal Part I of this document describes systems and techniques for optical tunable phase-coherent multiplexing, for example, of four 20-Gbit/s on-off keying (OOK) channels at different wavelengths into a single 80-Gbit/s 16-QAM channel and also a single star 16-QAM channel using periodically-polled lithium niobate (PPLN) devices.

Higher-order modulation formats can provide high spectral efficiency and high tolerance to fiber-based dispersion and nonlinear effects. For example, 16 quadrature-amplitude-modulation (QAM) and star 16-QAM are generally of interest, and data constellations of about 512-QAM have been reported (e.g., S. Okamoto, et al, ECOC 2010, paper PD2.3).

Conventionally, 16 QAM can be generated by n-phase/quadrature (IQ) modulators using either: (a) 2 cascaded IQ modulators, with binary electrical driving signals, or (b) generating two separate 4-level amplitude signals to drive each arm of one IQ modulator. These approaches may not scale easily to high baud rates or constellation sizes. However, it may be desirable to generate 16 QAM and higher order modulation formats using optical approaches, such that the base format is simple on-off keying (OOK), the multiplexing is bit-rate tunable, and the potential exists for high baud rates and constellation sizes.

In part I of this specification, examples of tunable phase-coherent optical multiplexing are described. For example, tunable phase-coherent optical multiplexing of four 20-Gbaud OOK Signals from different wavelengths into a single 80-Gbit/s 16-QAM channel and also a single star 16-QAM channel based on coherent vector addition of input signals using periodically-polled lithium niobate (PPLN) waveguides, and tunable phase-coherent multiplexing of two 20-Gbaud OOK Signals into a single quadrature-phase-shift-keyed (QPSK) and also a single four level amplitude/phase modulation (PAM) channel respectively, are described.

Figure 1A:
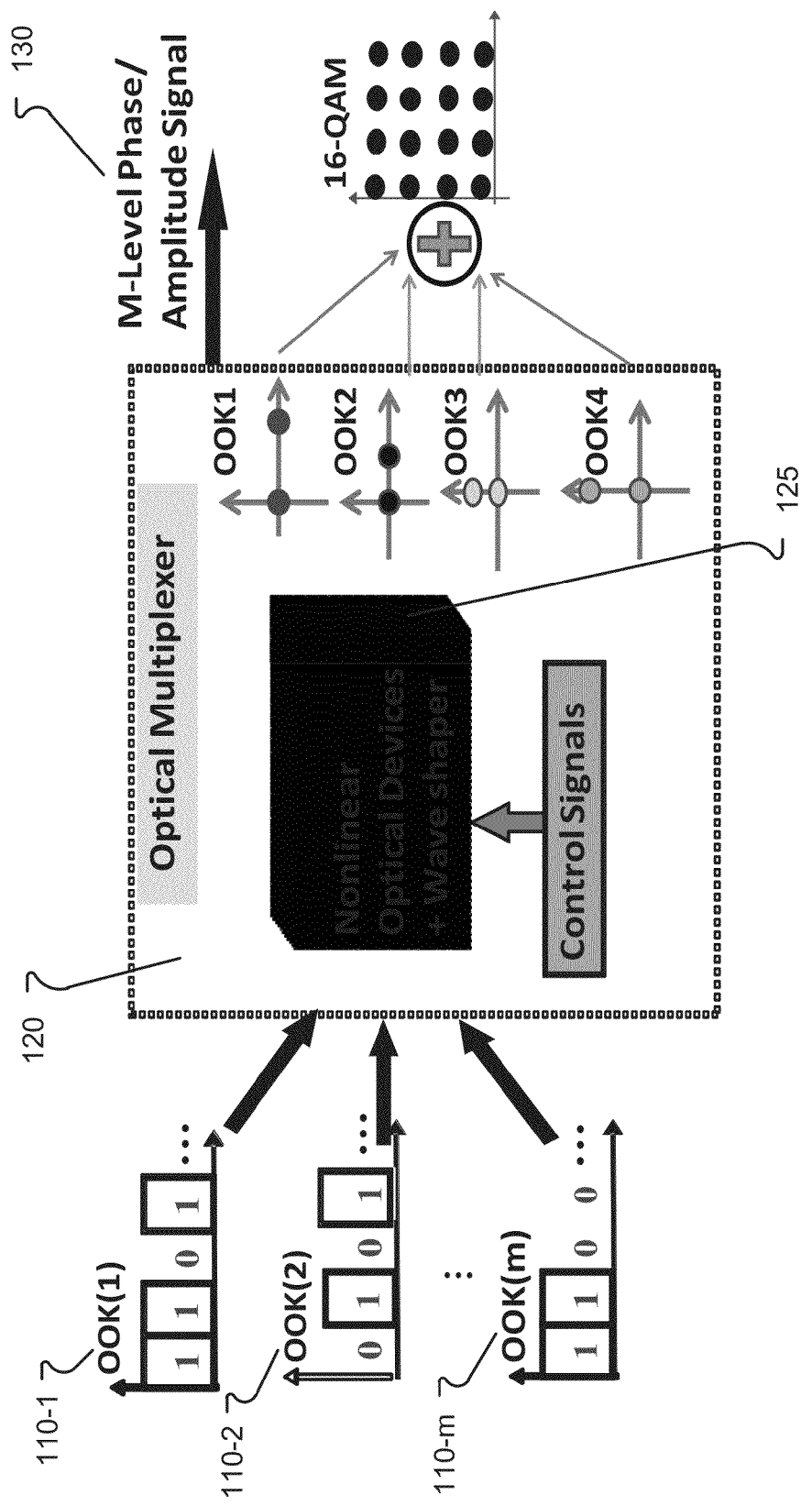
FIG. 1A shows a diagram of an example of optical multiplexin of M OOK channels into a single M-Level Phase/Amplitude channel.

FIG. 1A shows a diagram of an example of optical multiplexing of m OOK channels into a single M-Level Phase/Amplitude channel (e.g., multiplexing of 4 OOK channels into a single 16 QAM channel). Multiple on-off keying (OOK) input signals, such as OOK input signals 110-1, 110-2, 110-m, can be multiplexed into an M-level phase/amplitude modulated signal 130 based on coherent vector addition by optical multiplexer 120. The optical multiplexer 120 can include nonlinear optical devices and wave shaper 125.

Each point of the 16-QAM constellation in the I/Q plane can be interpreted as a coherent vector addition of a first constellation point from OOK1, a second constellation point from OOK2, a third constellation point from OOK3 and a fourth constellation point from OOK4. In some implementations, the vector magnitude of OOK1 and OOK4 should be twice (e.g., a 6-dB power difference) that of the vector magnitude of OOK2 and OOK3 and also a $\pi/2$ phase difference between OOK1, OOK4 and OOK2, OOK3 should be applied in order to get 16-QAM.

Figure 1B:
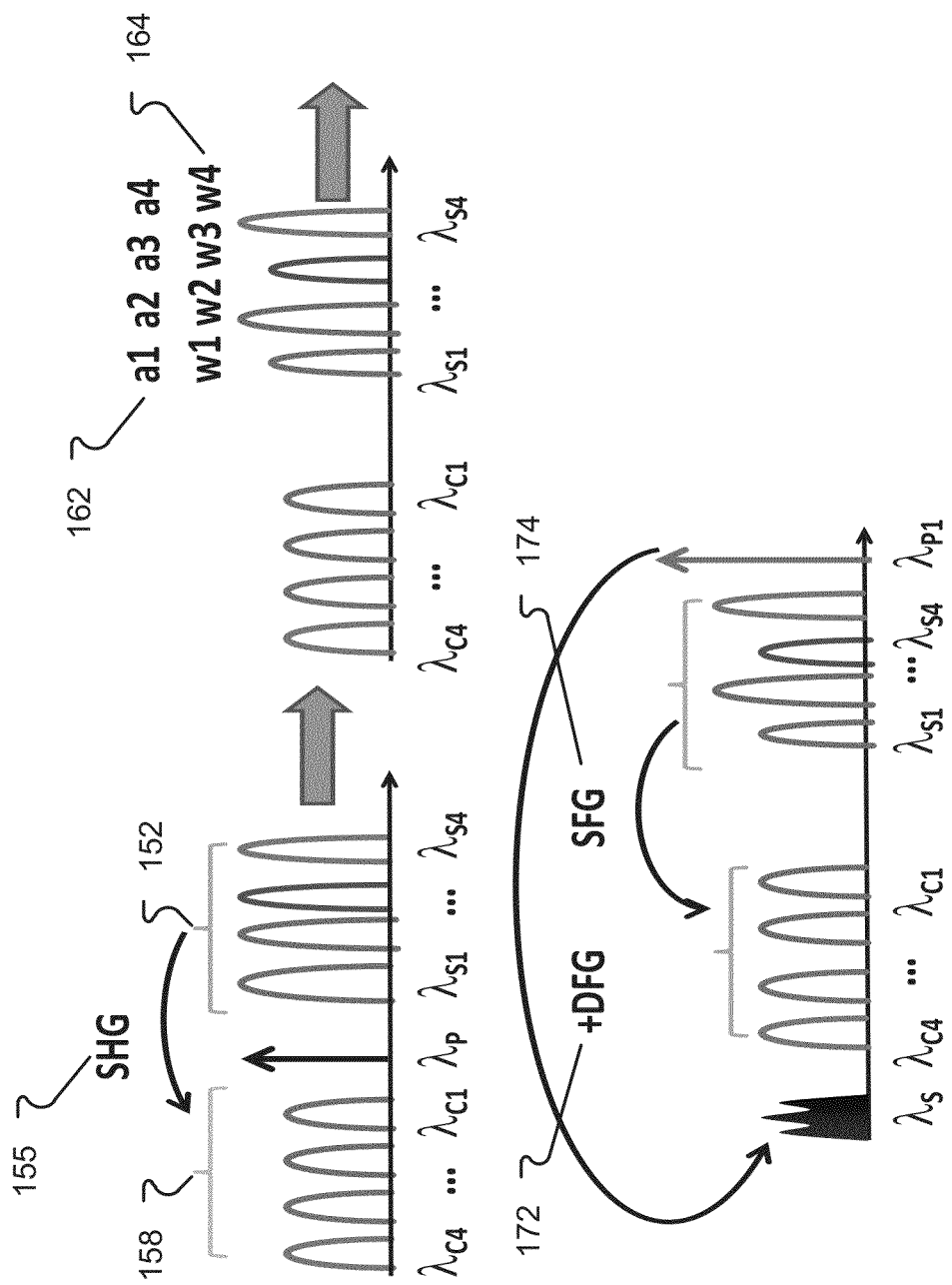
FIG. 1B shows a diagram of an example of optical multiplexing of four OOK inputs into a 16-QAM and a star 16-QAM signal.

FIG. 1B shows a diagram of an example of optical multiplexing of four OOK inputs into a 16-QAM and a star 16-QAM signal. The optical multiplexing can be based on coherent vector addition using two periodically-polled Lithium Niobate (PPLN) waveguides. Phase conjugate copies 158 of incoming signals 152 can be generated using a second harmonic generation (SHG) process 155 in a first PPLN waveguide.

After applying an appropriate phase 162 and amplitude weight 164 to each OOK signal by an optical wave shaper, the phase conjugate copies of input signals and the input OOKs are filtered and sent to a second PPLN waveguide with a similar quasi-phase matching (QPM) wavelength. All input signals can become coherent as a result of sum frequency generation (SFG) 174 between the input OOKs and their phase conjugate copies as this process erases the phase differences between input OOK signals. Therefore all incoming signals can add coherently at an identical wavelength based on a difference frequency generation (DFG) process 172 using a continuous wave (CW) pump. If the multiplexed signal has an offset constellation, the DC signal can be removed by a coherent vector addition of a CW pump with an appropriate phase and amplitude and the offset multiplexed signal.

Figure 2:
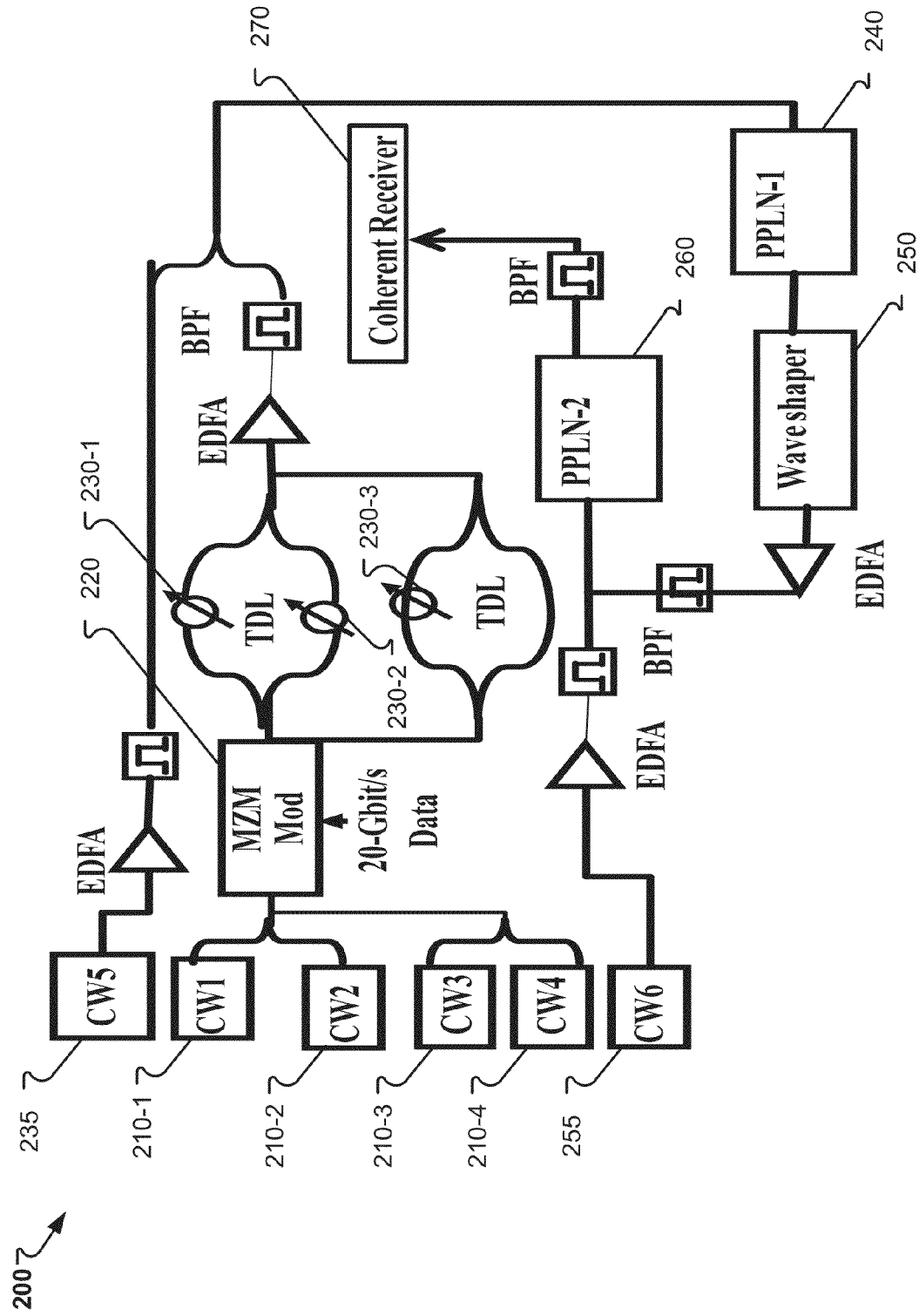
FIG. 2 shows an exemplary setup for generating a coherently multiplexed signal.

FIG. 2 shows an exemplary setup 200 for generating a coherently multiplexed signal. In this example, four continuous-wave (CW) lasers 210-1, 210-2, 210-3, and 210-4 are modulated using a Mach-Zehnder modulator (MZM) 220 to generate OOK channels each, for example, at 20-Gbit/s. which are then decorrelated using three tunable delay lines (TDL) 230-1, 230-2, and 230-3, and passed through an erbium-doped fiber amplifier (EDFA) a band-pass filter (BPF).

The four independent OOK signals and a CW pump 235 at QPM wavelength are then sent to a first periodically-polled Lithium Niobate (PPLN) 240, for example with a QPM wavelength of ~1550.7 nm. In this example, the phase conjugate copies of inputs and incoming signals are then filtered and sent to a second PPLN 260 with the same QPM wavelength after passing through an optical wave shaper 250 to apply appropriate phases and amplitude weights to the original signals. Another CW pump 255 can be used for the DFG process, and the coherently multiplexed signal is filtered out and detected using a coherent receiver 270.

As shown in the example of FIGS. 3A-3F, two incoming OOK signals 310-1, 310-2 can be multiplexed into a single 4-PAM channel 350 if the OOK signals at the wave shaper output are in phase and with a 6 dB power difference, for example. Two OOK inputs can also be multiplexed into a QPSK channel if the input OOKs have the same power and a $\pi/2$ phase difference respectively. FIGS. 3A-3B show an example of back-to-back optical eye and constellation diagrams of two 20 Gb/s OOK inputs 310-1, 310-2. FIG. 3C shows an example of an optical spectrum 370 at the output of the first PPLN with two incoming OOK signals, such as OOK inputs 310-1 and 310-2, and a CW pump to remove DC from the constellations. FIG. 3D shows an example of an optical spectrum 380 at the output of the second PPLN. FIG. 3E shows an example of an optical eye and constellation diagram of a multiplexed 4-PAM signal 350. FIG. 3F shows an example of an optical constellation diagram of a multiplexed QPSK signal 360 with EVM of 18.5.

FIGS. 4A-4D show an example of optical multiplexing of four OOK inputs into a 16 QAM signal with a DC offset and optical multiplexing of 4 OOK channels into a star 16 QAM signal. FIG. 4A shows an example of an optical spectrum 410 at the output of the first PPLN with four incoming OOK signals. FIG. 4B shows an example of an optical spectrum 420 at the output of the second PPLN. FIG. 4C shows an example of an optical constellation diagram of a 16-QAM signal 430 with a DC offset generated by multiplexing of four OOKs. FIG. 4D shows an example of an optical constellation diagram of a star 16-QAM signal 440 generated by multiplexing of four OOKs and a CW pump as a DC remover.

Part II: Flexible, Reconfigurable Capacity Output of a High-Performance 64-QAM Optical Transmitter Part II of this document describes systems and techniques related to a reconfigurable optical flexible transmitter to generate arbitrary optical quadrature-amplitude-modulation (QAM) (e.g., optical 16-QAM and 64-QAM can be generated at EVM 8.5% and 7.2% respectively). For example, transmission through 80-km SMF-28 after compensating with 20-km DCF can be achieved with negligible penalty.

Although transmitters can provide enormous data pipes, two specific challenges may remain: (1) a large discrepancy between high-rate and low-rate data channels, such that the large capacity of a single data channel from the transceiver may not be required and/or under-utilized, and (2) the large capital investment in terminal transmitters may not be efficiently utilized. A laudable goal would be to have transmitters whose extremely large capacity can be tailored and be shared among many different channels as the traffic demands vary in a dynamic, heterogeneous network. Flexible, reconfigurable bandwidth allocation can enable optimal use of terminal equipment as well as create new opportunities for scalable, cost-effective network architectures.

In some implementations, a flexible transmitter can be provided by using optical nonlinearities to perform reconfigurable multiplexing of different data channels, such that the capacity and data constellation can be reapportioned among different output wavelengths, i.e., data can emerge as a single 64-QAM (quadrature-amplitude modulation) signal or 3 independent QPSK (quadrature-phase-shift-keyed) signals, for example. Wave-mixing using nonlinearities can have: (a) >THz bandwidths, (b) minimal noise generation, (c) wavelength, conversion of a data channel, and/or (d) transparency to the data bit rate and modulation format.

Conventional implementations for a flexible transmitter may include methods in which: (a) IQ modulators on individual frequency combs allocate the bandwidth and (b) elastic optical path network using OFDM and variable-bandwidth wavelength crossconnects. With respect to using nonlinearities, (a) multiplexing of two 10 Gbaud QPSK signals to a 10 Gbaud star 16-QAM, (b) numerical results on various 16-QAM generation using dual-parallel Mach-Zehnder modulator (MZM) and phase modulators, and (c) numerical results on multiplexing one OOK and two binary phase-shift keying (BPSK) signals into 8-amplitude phase-shift keying (APSK) using cross phase modulation (XPM) and four wave mixing (FWM) in highly nonlinear fiber (HNLF) have been implemented.

In this specification, a flexible, reconfigurable capacity output of, for example, a high-performance 64-QAM optical transmitter is described. In some implementations, nonlinearity based optical signal processing can be used to achieve reconfigurability and flexibility in allocation of capacity per channel and bandwidth.

Figure 5:
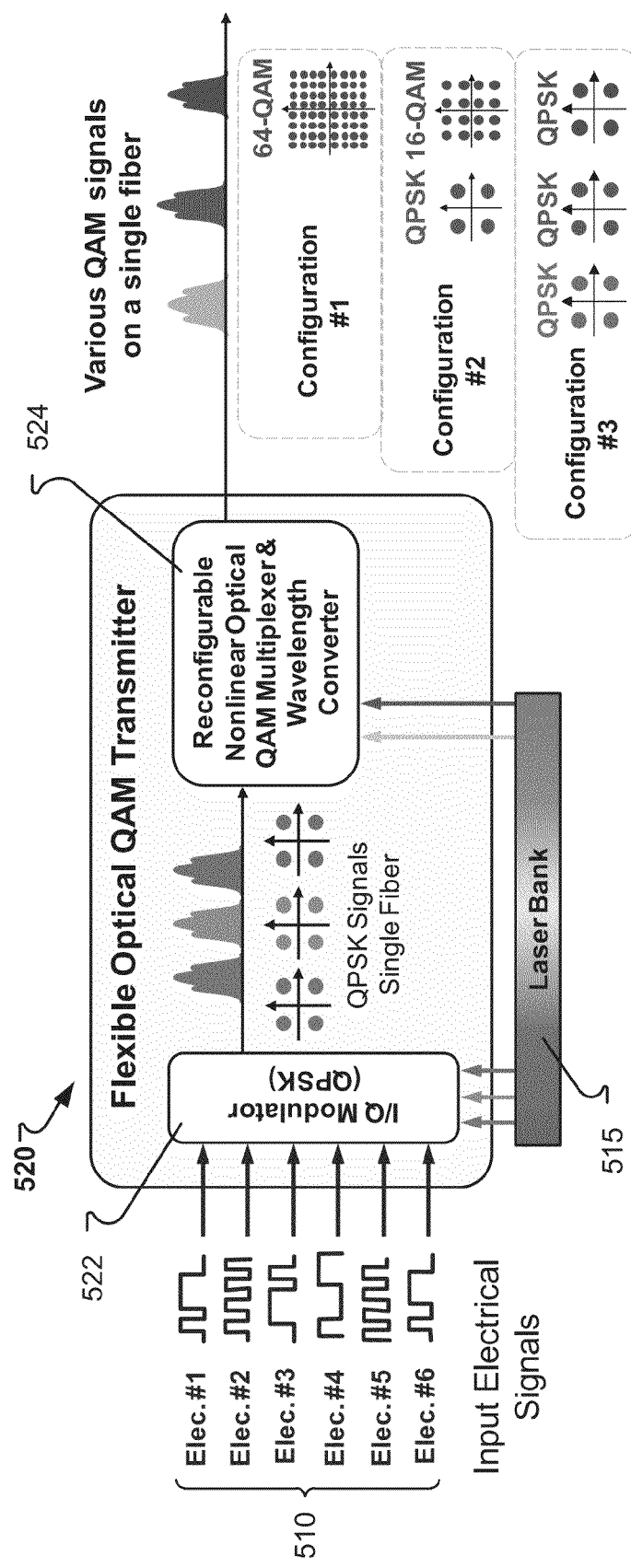
FIG. 5 shows a block diagram of an example of a flexible capacity QAM transmitter.

FIG. 5 shows a block diagram of an example of a flexible capacity QAM transmitter. In this example, multiple (here 6) electrical signals 510 are input to the system and the output capacity can be configured by changing the lasers 515 configuration into the flexible transmitter 520. In the flexible transmitter 520, first, many quadrature-amplitude-shift-keyed (QPSK) signals at various wavelengths can be generated by an I/Q modulator 522 in order to convert the electrical signals 510 to the optical domain. The optical QPSK signals can be injected into an optical system that generates various higher order QAM signals at different wavelengths from the QPSK signals.

In some implementations, the optical QAM multiplexer/wavelength converter 524 utilizes a series of cascaded second order nonlinear wave mixings (i.e., sum frequency generation (SHG), difference frequency generation (DFG) and second harmonic generation (SHG)) in periodically-poled-lithium-niobate (PPLN) waveguides in conjunction with dispersion compensating fiber (DCF) to create the output. In the optical QAM multiplexer, a continuous wave (CW) pump ($E_{CW}$) at the quasi-phase-matching (QPM) wavelength of the PPLN waveguide can be injected to the PPLN waveguide together with the QPSK signals ($E_{Di}(t)$). This generates copies of the signals at new wavelengths with complex fields $|E_{CW}|^2(E_{Di}(t))^*$. The original QPSK signals, their copies and the CW pump can be sent into a DCF that induces one symbol delay between the original signal and its copy and then into the second PPLN waveguide for multiplexing. Another QPSK signal ($E_P(t)$) can also be injected into the second PPLN. Because all signals and pumps are on the same optical path, the coherency can be preserved and according to SFG, DFG and SHG rules, the multiplexed signal can become proportional to $\Sigma|E_{CW}|^2(1+\alpha|E_{Di}(t)|^2 e^{j(\Phi(t)-\Phi(t-T))})(E_P(t))^*$. This gives the multiplexing an equation of multiplexing of $E_{Di}(t)$'s and $E_P(t)$. Thus, although the phase of $E_{Di}(t)$ may be lost in the process, because of one symbol delay, the difference of the phase can be preserved and used for multiplexing. Because nonlinear mixings can be controlled by reconfiguring pump lasers, the flexible transmitter 520 can simultaneously allocate capacity on different wavelengths, flexibly and reconfigurably. Three example output configurations, i.e., configuration #1 (a 64-QAM signal), configuration #2 (a QPSK and a 16-QAM signal), and configuration #3 (three QPSK signals), as shown in FIG. 5, are described below with respect to FIGS. 7A-8D.

Figure 6:
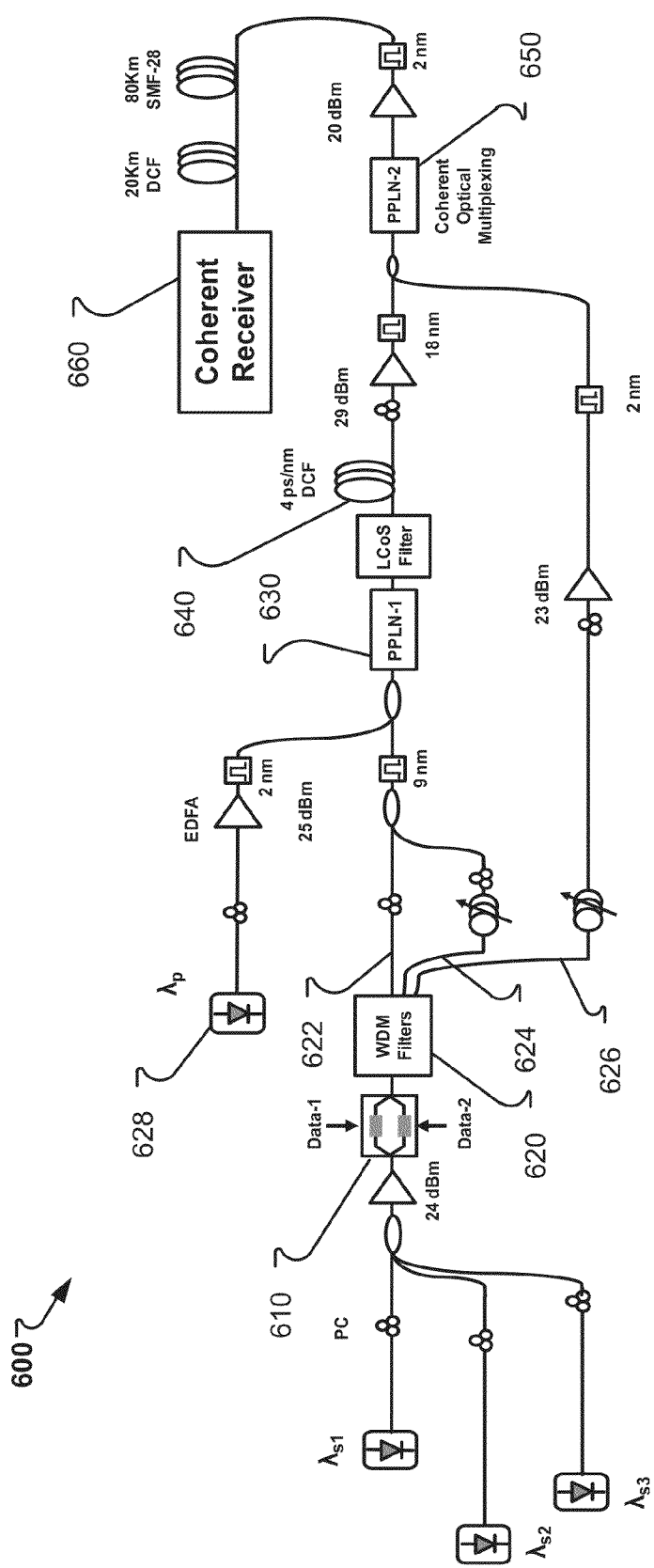
FIG. 6 shows an example of a setup for a flexible transmitter.

FIG. 6 shows an example of a setup 600 for a flexible transmitter, such as flexible transmitter 520. A nested Mach-Zehnder modulator 610 can be used to generate the 40-Gbit/s QPSK data (PRBS $2^{31}$-1), for example at ~1558.2, 1555 and 1553.4 nm.

The resulting signals can be sent to WDM filter 620 to separate and uncorrelate them with respect to each other. The two QPSK signals 622 and 624, for example at 1553.4 and 1555 nm, can be combined with CW pump laser 628 and sent to a first PPLN 630 (e.g., 5-cm length) after enough amplification to generate a phase conjugate of the original signal. The output of the first PPLN 630 can be passed through a DCF 640 to induce one bit delay between input signals and their corresponding phase conjugate copies. The signals, their copies and CW pump lasers as well as QPSK signal 626, for example at 1558.2, can be sent to a second PPLN 650 (e.g., 4-cm length) to generate the desired output. The output signal is then sent to a fiber spool (e.g., 80 km SMF-28) and DCF (e.g., 20 km). The resulting signal can be sent to a coherent receiver 660 to obtain I-Q constellation and measure the bit error rate (BER).

FIG. 7A shows an example of an optical spectrum 710 of a first stage in which phase conjugate copies of original QPSK signals are generated at corresponding wavelengths. These copies can be used in a second stage to generate an output signal.

In order to implement the first configuration (i.e., configuration #1 as shown in FIG. 5) an offset 16-QAM signal, which can be generated by multiplexing two QPSK signals and a CW pump laser with appropriate phases and amplitudes, can be mixed with another QPSK signal, for example. FIG. 7B shows an example of an optical spectrum 720 of an output of a second PPLN as well as a final I-Q constellation. When using the described flexible transmitter, a 64-QAM 730 with EVM ~7% as shown in FIG. 7C can be generated, for example.

As shown in FIGS. 8A-8B, for the second configuration (i.e., configuration #2 as shown in FIG. 5), similar to the previous one, two QPSK can be multiplexed to generate a 16-QAM 810 at the first output channel, for example. The second output 815, on the other hand, is a copy of the third QPSK signals at the output.

In some implementations, the transmitter can be reconfigured to generate 3 QPSK signals 820 (i.e., configuration #3l as shown in FIG. 5), for example, at 1542.17, 1543.8 and 1545.4 nm, as shown in FIGS. 8C-8D. In some implementations, an EVM of ~11% can be achieved for all QPSK signals.

Figure 9:
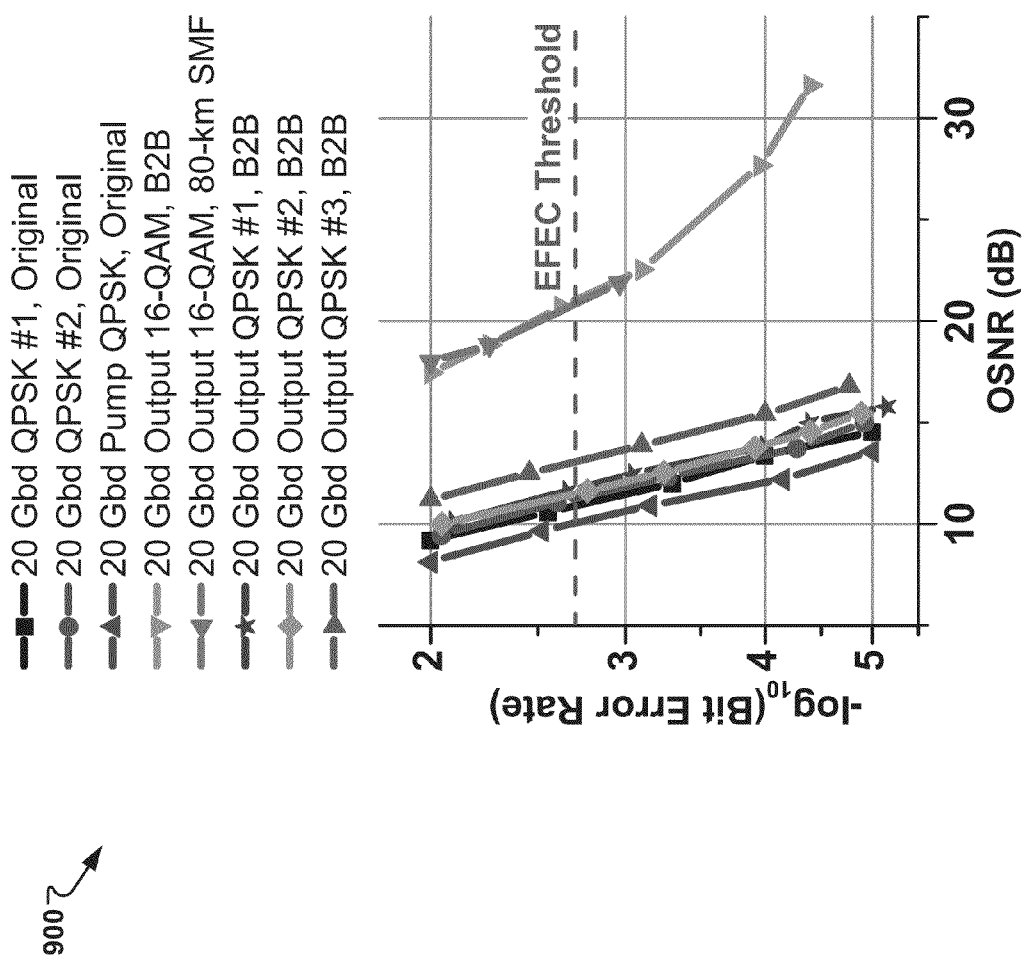
FIG. 9 shows a diagram of an example of BER (bit error rate).

FIG. 9 shows a diagram 900 of an example of bit error rates (BER). In this example, various BER scenarios of a 16-QAM that is transmitted through a fiber spool (in this example 80 km SMF-28) and DCF (in this example 20 km) to evaluate transmission capability, are shown. In this example, the OSNR penalty after the transmission (in this example 100 km) is negligible.

Part III: Tunable Optical Generation of Modulation Formats Using Nonlinearities and Coherent Frequency Comb Part III of this document describes the generation of optical quadrature-amplitude-modulation (QAM) (e.g., optical 16-QAM and 64-QAM can be generated at EVM 6.8% and. 6.4% respectively) using nonlinearities and coherent frequency comb. For example, transmission through 80-km SMF-28 after compensating with 20-km DCF can be achieved with negligible penalty.

Higher-order modulation formats for optical communication systems can provide higher spectral efficiency in terms of bit/s/Hz. Quadrature phase shift keying (QPSK) is an example of 4-ary phase encoding, whereas 16 quadrature amplitude modulation (QAM) is an example of 16-ary amplitude/phase encoding. Moreover, QAM can go to higher orders, such as 64 and beyond.

Conventionally, higher-order formats can be generated by using electronic circuits to drive an I/Q modulator. However, key challenges for this approach are: (a) the limited linearity of the electronics at high baud rates, such that the spacing of the data constellation points on the I/Q plot will no longer be uniform, and/or (b) electronic approaches may become difficult at rates exceeding 100-Gbaud.

As an alternative, nonlinear optical processes hold the promise of high speed, format and phase transparency, low noise, and high linearity. For example, an NOLM loop can be used to multiplex 4 OOK signals into a 16-QAM. These methods may not be transparent for phase modulation formats. In part II of this document, a method to multiplex QPSK signals into a 64-QAM using 2 cascaded nonlinear stages has been described. In some implementations, the quality of the generated QAM can be improved by reducing the number of nonlinear stages. Fewer nonlinear stages may provide better efficiency and the potential to go to higher-order formats.

In this specification, a scheme for tunable optical generation of higher-order modulation formats using nonlinearities and coherent frequency comb is described. In some implementations, because of the coherency of comb fingers, coherent multiplexing process can be done in one nonlinear stage (e.g., optical 16-QAM and 64-QAM can be generated at EVM 6.8% and 6.4% respectively). For example, transmission through 80 km SMF-28 after compensating with 20 km DCF can be achieved with negligible penalty.

Figure 10:
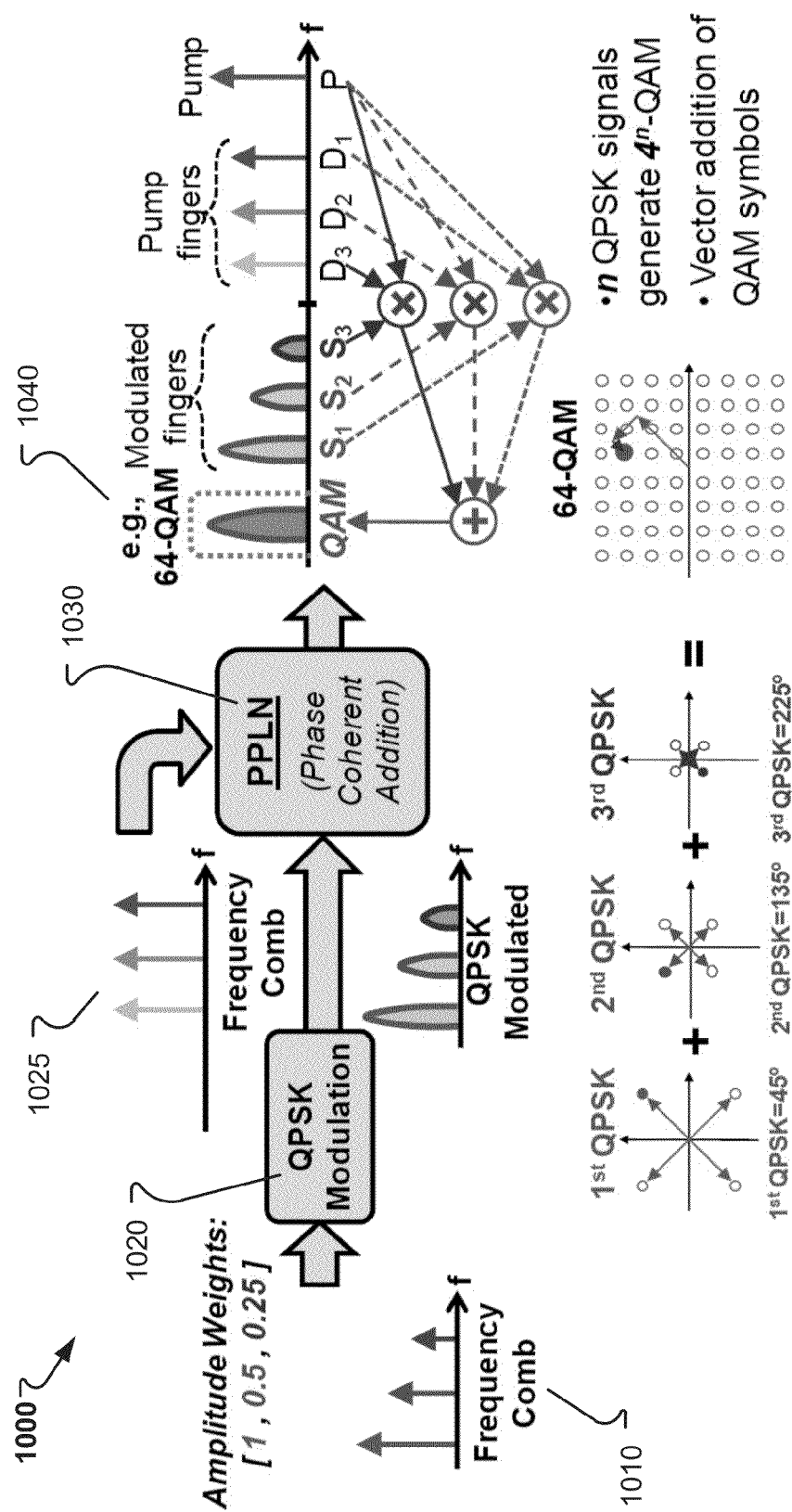
FIG. 10 shows a block diagram of an example of a tunable optical QAM transmitter.

FIG. 10 shows a block diagram of an example of a tunable optical QAM transmitter 1000. Multiple elements (also referred to as fingers) from a coherent frequency comb source 1010 can be selected and modulated using an I/Q modulator 1020 with QPSK modulation format. A frequency comb can be a light source whose spectrum consists of a series of discrete, equaly spaced elements. These modulated signals along with another set of coherent comb fingers 1025 with equal frequency spacing and a CW pump laser ($E_{CW}$) can be injected into a periodically-poled-lithium-niobate (PPLN) waveguide 1030 to perform phase coherent addition of the modulated QSPK signals. This process can be done through two cascaded second order nonlinear wave mixings (sum frequency generation (SFG), difference frequency generation (DFG)). The multiplexed signal can become proportional to $(E_{CW}(t))^* \Sigma E_{Pi}(t) \cdot E_{Si}(t)$. The amplitude and phase of comb fingers can determine the coefficients of this coherent addition and thus, by varying these parameters, QAM 1040 with different constellation size and/or encoding can be generated.

Figure 11:
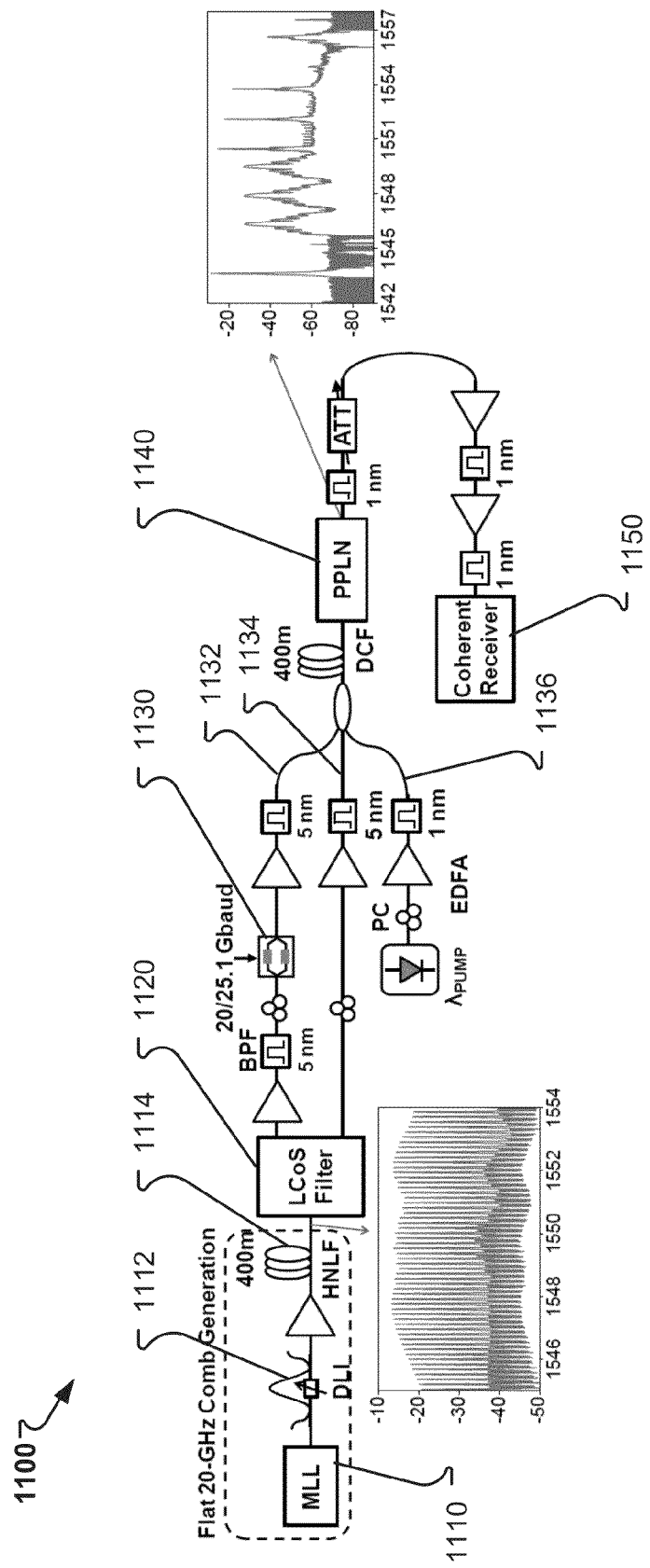
FIG. 11 shows an example of a setup for the tunable QAM encoder.

FIG. 11 shows an example of a setup 1100 for the tunable QAM encoder that can generate higher-order QAM. A mode-locked laser (MLL), for example with 10 GHz repetition rate and 2-ps pulse width, can be used to generate a coherent comb (e.g., with 10-GHz frequency spacing). In this example, the optical comb 1110 is passed through a delay-line-interferometer (DLI) 1112 (e.g., with FSR 20-GHz) to increase the frequency spacing. The comb (e.g, 20-GHz) is then passed through a highly nonlinear fiber (HNLF) 1114 to generate a flat and broad spectrum. A Liquid Crystal on Silicon (LCoS) filter 1120 can be used to select and write complex weights on comb fingers and separate them into signal path and pump path. A nested Mach-Zehnder modulator 1130 can be used to generate the 20/25.1-Gbit/s BPSK/QPSK data (PRBS $2^{31}$-1) on the signal path, for example. These signals 1132 along with the comb fingers selected for pump path 1134 and a CW laser pump 1136 can be sent to a PPLN 1140 (e.g., 5-cm length) after enough amplification to perform coherent multiplexing of the original signals. The multiplexed signal is then filtered and sent to the coherent receiver 1150.

Figures 12A, 12B, 12C:
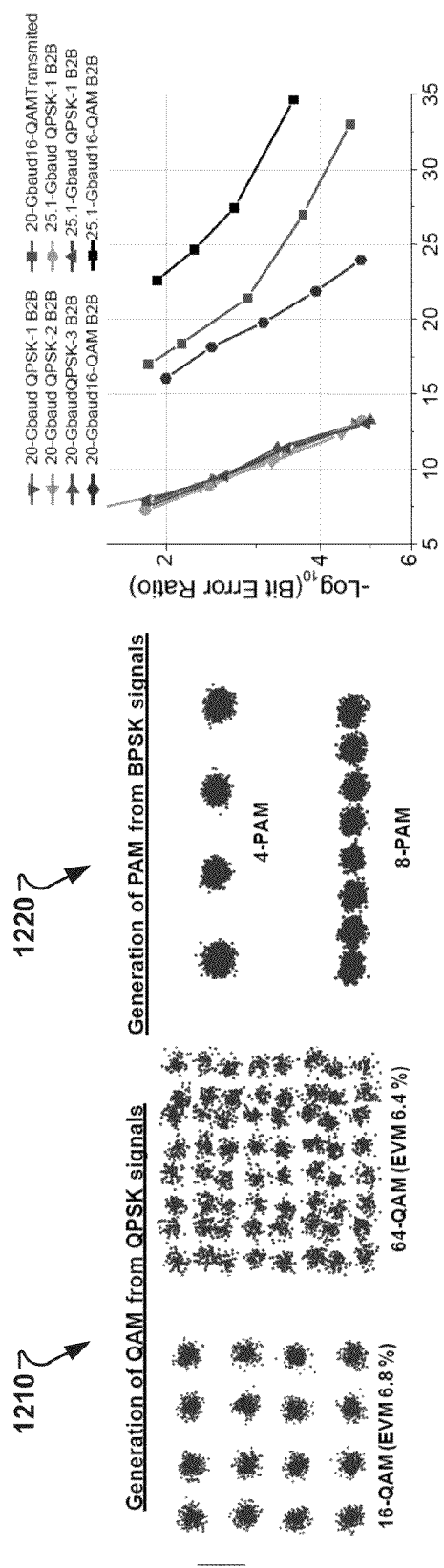
FIGS. 12A-12B show examples for generating QAM and pulse-amplitude-modulation Signals.
FIG. 12C shows another diagram of an example of BER.

FIG. 12A shows an example for generating QAM using 20-Gbaud QPSK signals. By coherent multiplexing of two QPSK signals with appropriate weights, a 16-QAM with EVM 6.8% can be generated, for example. A 64-QAM constellation 1210 with EVM 6.4% is also shown in FIG. 12A, which can be generated from three QPSK signals, for example. In some implementations, if the original signals are two or three BPSK signals, pulse-amplitude-modulation (PAM) signals 1220 with 4 and 8 points respectively can be generated as shown in FIG. 12B. The performance of the higher-order QAM encoder can be assessed using bit error rate (BER) measurements as shown in FIG. 12C. In some implementations, a 16-QAM signal can be generated at both 20-Gbaud and 25.1-Gbaud. For example, the 20-Gbaud 16-QAM can be transmitted through 80 km SMF-28 and 20 km DCF fiber with negligible power penalty.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other implementations fall within the scope of the following claims.

What is claimed is:

1. A method comprising:
   receiving optical data signals having a first data order, wherein the received optical data signals have respective input frequencies that are different from each other;
   selecting from the received optical data signals a subset of optical data signals that has at least one but fewer than all of the received optical data signals;
   generating phase conjugates and copies of the selected optical data signals that have respective intermediate frequencies that are different from each other and from the input frequencies; and
   generating an output optical signal having a second data order higher than the first data order at least by combining at least the generated phase conjugates and copies of the selected optical data signals with remaining, non-selected one or more of the received optical data signals, wherein the generated output signal has an output frequency different from the input frequencies and from the intermediate frequencies.

2. The method of claim 1, where generating the phase conjugates and copies of the selected optical data signals comprises combining the selected optical data signal with a pump output.

3. The method of claim 1, comprising:
   introducing a delay between each copy of the selected optical data signal and its phase conjugate prior to combining them together.

4. The method of claim 1, comprising:
   receiving independent data signals from electrical devices; and
   converting the received independent data signals to the optical data signals using electrical to optical devices.

5. The method of claim 1, where
   the received optical data signals are three quadrature-phase-shift keyed (QPSK) optical signals,
   the remaining, non-selected one or more of the received optical data signals is a single non-selected QPSK optical signal, and
   said combining of the generated phase conjugates and copies of the two selected QPSK optical signals with the non-selected QPSK optical signal generates the output optical signal as a 64 quadrature-amplitude-modulation (QAM) optical signal.

6. The method of claim 1, where
   the received optical data signals are three quadrature-phase-shift keyed (QPSK) optical signals,
   the remaining, non-selected one or more of the received optical data signals is a single non-selected QPSK optical signal, and, and
   said combining of the generated phase conjugates and copies of the two selected QPSK optical signals with the non-selected QPSK optical signal generates the output optical signal as a 16 quadrature-amplitude-modulation (QAM) optical signal and a copy of the non-selected QPSK optical signal having a second output frequency different from the output frequency of the 16-QAM optical signal and from an input frequency of the non-selected QPSK optical signal.

7. A reconfigurable optical transmitter comprising:
   multiple ports to receive optical data signals having a first data order, wherein the optical data signals received at the multiple ports have respective input frequencies that are different from each other;
   a first module for generating a first nonlinear wave mixing, the first module arranged to receive only a subset of optical data signals from among the optical data signals received at the multiple ports, wherein the subset has at least one but fewer than all of the optical data signals received at the multiple ports, the first module comprising:
      at least one optical pump laser; and
      a first periodically-poled-lithium-niobate waveguide configured and arranged to generate phase conjugates and copies of the optical data signals of the subset at least by combining the optical data signals of the subset with an output of the optical pump laser, wherein the phase conjugates and copies of the optical data signals of the subset have respective intermediate frequencies that are different from each other and from the input frequencies; and a second module for generating a second nonlinear wave mixing, the second module comprising:

a second periodically-poled-lithium-niobate waveguide configured and arranged to generate an output optical signal having a second data order higher than the first data order at least by combining the generated phase conjugates and copies of the optical data signals of the subset with remaining one or more of the optical data signals received at the multiple ports that are not part of the subset and with the output of the optical pump laser, wherein the generated output signal has an output frequency different from the input frequencies and from the intermediate frequencies.

8. The reconfigurable optical transmitter of claim 7, wherein the first module for generating a first nonlinear wave mixing further comprises a chromatic dispersion element to introduce a delay between each copy of optical data signal of the subset and its phase conjugate prior to combining them together.

9. The reconfigurable optical transmitter of claim 8, where the chromatic dispersion element comprises a dispersion compensating fiber.

10. The reconfigurable optical transmitter of claim 7, wherein the first module for generating a first nonlinear wave mixing further comprises a beam-shaping filter to separate by intermediate frequency the generated phase conjugates and copies of the optical signals of the subset.

11. The reconfigurable optical transmitter of claim 10, where the beam-shaping filter comprises a liquid-crystal-on-silicon filter.

12. The reconfigurable optical transmitter of claim 7, where the optical data signals received at the multiple ports are three quadrature-phase-shift keyed (QPSK) optical signals, the remaining one or more of the optical data signals received at the multiple ports that are not part of the subset is a single QPSK optical signal, and said combining of the generated phase conjugates and copies of the two QPSK optical signals of the subset with the QPSK optical signal that is not part of the subset and with the output of the optical pump laser generates the output optical signal as a 64-quadrature-amplitude-modulation (QAM) optical signal.

13. The reconfigurable optical transmitter of claim 7, where the optical data signals received at the multiple ports are three quadrature-phase-shift keyed (QPSK) optical signals, the remaining one or more of the optical data signals received at the multiple ports that are not part of the subset is a single QPSK optical signal, and said combining of the generated phase conjugates and copies of the two QPSK optical signals of the subset with the QPSK optical signal that is not part of the subset and with the output of the optical pump laser generates the output optical signal as a 16-quadrature-amplitude-modulation (QAM) optical signal and a copy of the QPSK optical signal that is not part of the subset having a second output frequency different from the output frequency of the 16-QAM optical signal and from an input frequency of the QPSK optical signal that is not part of the subset.

* * * * *